March 3, 1964     JACKSON CHUNG     3,122,945
COMBINATION PULLEY AND SPEED REDUCER Filed April 16, 1962     2 Sheets-Sheet 2

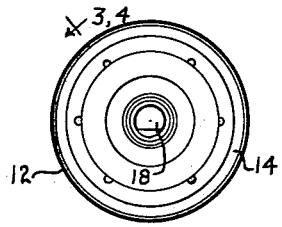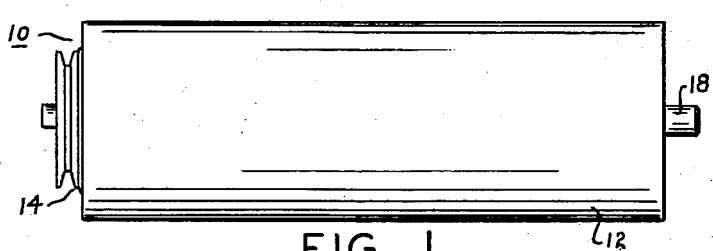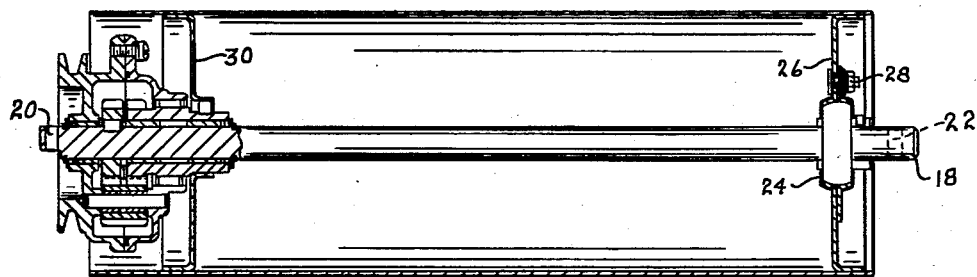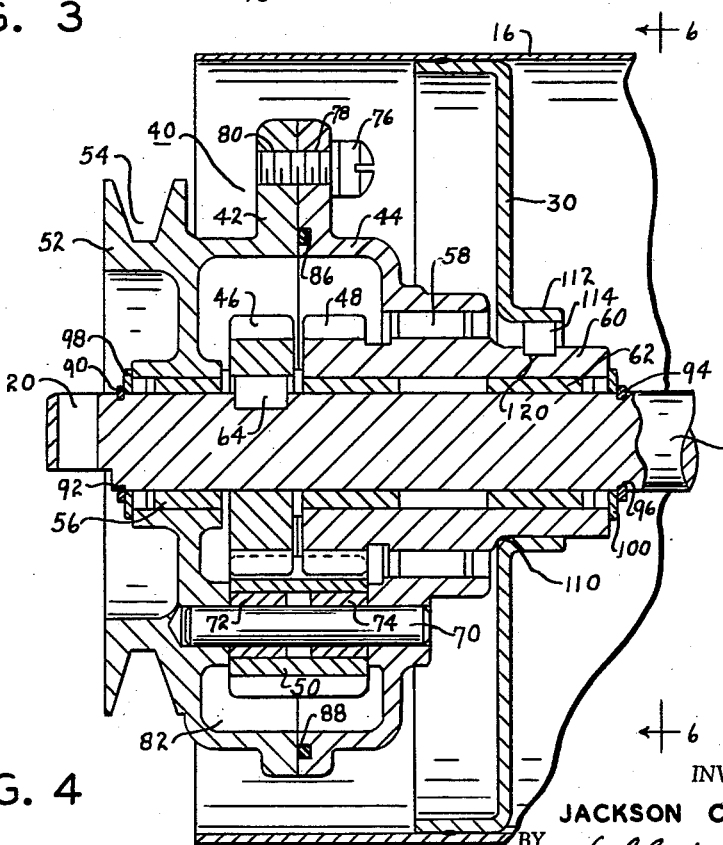

INVENTOR.
JACKSON CHUNG
BY *Hobbs & Easton*
ATTORNEYS

United States Patent Office 3,122,945
Patented Mar. 3, 1964

3,122,945
COMBINATION PULLEY AND SPEED REDUCER
Jackson Chung, Mishawaka, Ind., assignor to Dodge Manufacturing Corporation, Mishawaka, Ind., a corporation of Indiana
Filed Apr. 16, 1962, Ser. No. 187,844
5 Claims. (Cl. 74—802)

The present invention relates to the combination of a pulley and speed reducer and more particularly to a combination pulley and speed reducer in which a planetary gear reduction unit is combined as an integral operative part of a pulley for a conveyor or the like.

In many conveyor installations, particularly those used extensively at the check-out counters in supermarkets and similar establishments, relatively short and slow moving load transporting belts and pulleys are used in conjunction with a gear reduction unit placed beneath or beside one of the pulleys in a limited space and driven through a belt from an electric motor. The space available for the gear reduction units and motor is often confined and required for other equipment used at the counter, for example, and thus necessitates the use of a compact conveyor drive mechanism which can be easily installed adjacent one of the conveyor pulleys and which will operate over extended periods of time with little or no service or attention. Gear reduction units separate or independent from the conveyor pulley and used in a series of belts from the motor to the reduction unit and pulley require an excessive amount of space and in many installations have not been entirely satisfactory from an operational standpoint. It is therefore one of the principal objects of the present invention to provide a power drive mechanism for conveyor pulleys of the aforementioned type in which the gear reduction unit therefor is mounted within the confines of the pulley rim, with only the pulley or other drive therefor projecting beyond the end of the rim and with the gear reduction unit forming a support and bearing for the conveyor pulley.

Another object of the invention is to provide a compact, relatively simple planetary gear reduction unit which can be produced on standard machine tools with simple, easily performed machining operations and which can be readily assembled and installed and thereafter easily serviced.

Still another object of the invention is to provide a versatile gear reduction unit which requires little space in addition to that required for a drive pulley, sheave or sprocket therefor, and which, with the supporting shaft on which it is mounted, can readily be connected to and disconnected from the driven element using simple, easily performed operations without the use of special tools or equipment.

Further objects and advantages of the invention will become apparent from the following description and accompanying drawings, wherein:

FIGURE 1 is a side elevational view of a conveyor pulley mounted on a shaft and having the present gear reduction unit incorporated therein in operative position;

FIGURE 2 is an end elevational view of the conveyor pulley gear reduction unit and shaft shown in FIGURE 1;

FIGURE 3 is a longitudinal cross sectional view of the conveyor pulley gear reduction unit and shaft shown in FIGURES 1 and 2, the section being taken on line 3—3 of FIGURE 2;

FIGURE 4 is an enlarged fragmentary cross sectional view of the gear reduction unit and conveyor pulley shown in FIGURE 3; the section being taken on line 4—4 of FIGURE 2;

Figure 5:
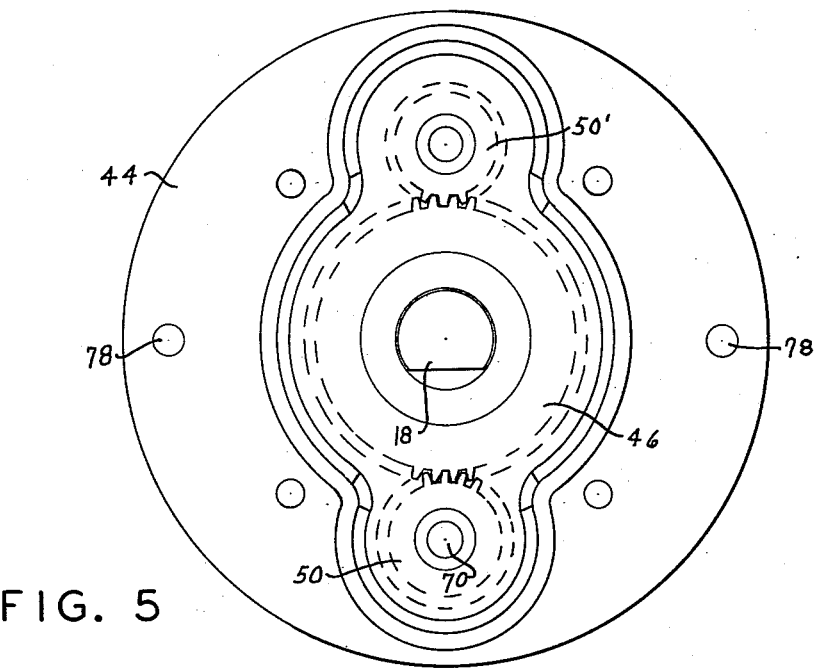
FIGURE 5 is an elevational view of the internal mechanism of the present gear reduction unit, with the external side of the housing and drive pulley therefor removed from the unit.
Figure 6:
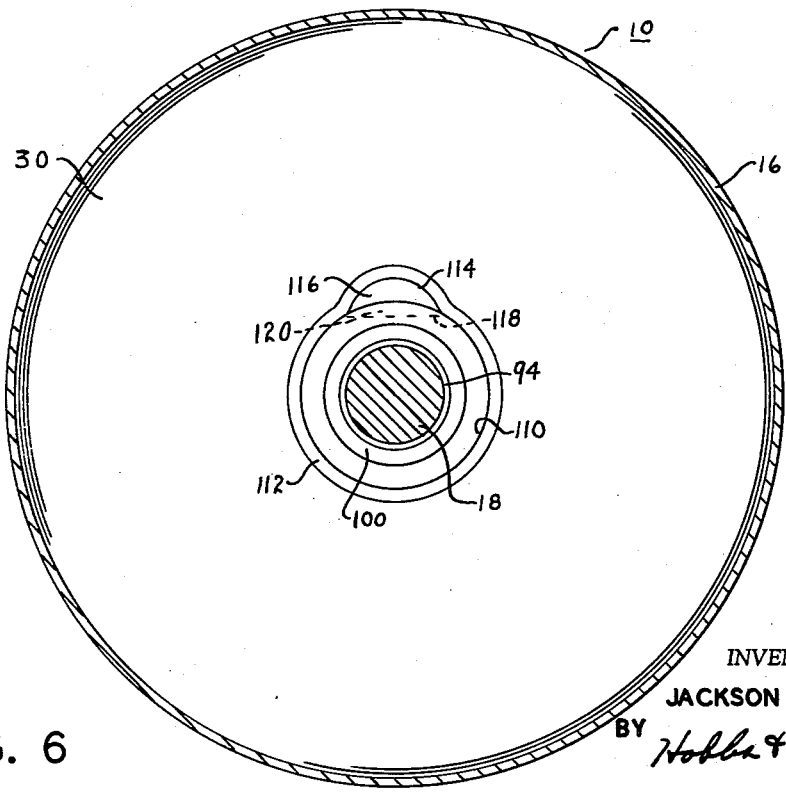
FIGURE 6 is a vertical cross sectional view through the present conveyor pulley, the section being taken on line 6—6 of FIGURE 4.

Referring more specifically to the drawings, numeral 10 designates generally the assembled combination conveyor pulley and gear reduction unit, numeral 12 designates the conveyor pulley, 14 the gear reduction unit mounted within rim 16 of the pulley, and numeral 18 a shaft on which the pulley 12 and gear reduction unit 14 are journalled. Shaft 18 is non-rotatable and is supported by blocks or other suitable supports positioned at its two ends and receives bolts or studs extending through holes 20 and 22 in the left and right-hand ends of the shaft, respectively, as viewed in FIGURES 1 and 3. The pulley is supported on the right-hand end by a bearing 24 secured to end disc 26 by a plurality of bolts 28 extending through an external flange of the bearing and through end disc 26. The bearing shown in the drawings may be considered conventional for the purpose of the present description and is preferably of the ball bearing, self-aligning type which is locked or otherwise secured to the shaft to prevent axial movement thereon. The opposite end of the pulley is supported on the inner end of gear reduction unit 14 by end disc 30 recessed inwardly sufficiently to permit unit 14 to be seated substantially fully in the end of the pulley. The pulley, consisting of rim 16 and end discs 26 and 30, is formed as an integral unit with the two end discs being welded permanently in place in the positions illustrated in the drawing in FIGURE 3, and may be of various diameters and lengths to satisfy requirements.

The gear reduction unit 14 consists of a housing 40 having external and internal portions 42 and 44, respectively, in which are mounted reaction and driven sun gears 46 and 48 and planet pinions 50 and 50'. Either one or two pinions can be used satisfactorily, and since they are identical in construction and operation, only one will be described in detail. A sheave 52 formed integrally with the outer side of external housing portion 42 is adapted to receive a V-belt in groove 54 for bodily rotating housing 40. The external portion 42 is journalled on bearing 56, which in turn is supported on stationary shaft 18, and internal housing portion 44 is journalled on bearing 58, which in turn is journalled on a power output sleeve 60 and bearing 62 supported by shaft 18. Reaction gear 46 is locked or secured to shaft 18 by a key 64 and is thus held in fixed, nonrotatable position on the shaft. Mounted on the inner end of power output sleeve 60 is a driven gear 48 of the same diameter as gear 46 and preferably formed integrally with the power output sleeve. While the two gears 46 and 48 are of the same diameter, gear 48 contains a larger number of equally spaced teeth, possibly one more tooth, than gear 46 and thus, in combination with pinion 50, provides the desired speed reduction between pulley 52 and power output sleeve 60. Gear 48 may contain either a larger or smaller number of teeth than gear 46. The same difference in number of teeth between the two gears in either direction from gear 46 to gear 48 produces the same difference in ratio of speed between the two gears, only the direction of rotation of gear 48 being changed.

Planetary pinion 50 contains one single set of teeth extending the full length of the desired size and spacing required to mesh simultaneously with the teeth on both gears 46 and 48 and is mounted for free rotation on pin 70, supported at its left-hand end in external housing portion 42, and at its right-hand end in internal housing portion 44. The pinion is journalled on bearings 72 and 74, which in turn are supported on pin 70, and is rotated by meshing with reaction gear 46 to drive driven gear 48. After gears 46 and 48 and pinion 50 on pin 70 have been assembled in housing portion 44, housing portion 42 is placed thereover and secured to housing portion 44 by a plurality of screws 76, extending through holes 78 in portion 44 and threadedly received in holes 80 in portion 42. The two housing portions form a chamber 82 for containing a suitable lubricant and are held in fluid-tight relationship with one another by a rubber gasket 86 seated in an annular groove 88 on the inner surface of housing portion 44.

The assembled gear reduction unit 14 is slipped axially on the end of shaft 18 and is held thereon in proper position by a snap ring 90 in annular groove 92 at the external end, and by a snap ring 94 in groove 96 at the internal end. Washers 98 and 100 are inserted between the respective snap rings and the adjacent ends of housings 42 and 44. One of the special features of the present invention is the construction connecting the gear reduction unit 14 with pulley 12, the construction consisting of a relatively large opening 110 in end disc 30, having a flange 112 extending laterally inwardly from the disc, the hole receiving the internal end of power output sleeve 60 and being only slightly larger in diameter than said sleeve. The drive connection between power output sleeve 60 and end disc 30 consists of an arcuately-shaped recess 114, formed in the edge of opening 110 and defined by flange 112. Seated in said recess 114 is an arcuate-shaped key 116, having a straight inner edge 118 seating in the bottom of a transversely positioned slot 120 in the external surface of power output sleeve 60. Arcuate key 116 fits loosely in arcuate slot 114, thus permitting the end of power output sleeve 60 to be easily slipped in opening 110 after key 116 has been inserted in slot 120, and thereafter permitting the sleeve and key to be easily removed when disassembling the unit from the pulley. The key forms a positive drive between sleeve 60 and disc 30, and will readily release itself from its engagement with the flange 112 whenever the torque being applied to the conveyor pulley by gear reduction unit 14 is reduced to zero.

After the unit has been assembled in the manner shown in the drawings, a V-belt is placed in groove 54 and onto a pulley of a suitable motor, which through the belt rotates housing 40 bodily carrying with it pinion 50. Rotation of pinion 50 around reaction gear 46 causes gear 48 to rotate, the reduction in speed between the housing and the output shaft being determined by the difference in number of teeth between gear 46 and gear 48. The power transmitted from sheave 52 through nonrotatable gear 46, revolving pinion 50 and gear 48 is transmitted to power output sleeve 60 and thence through key 116 and flange 112 to end disc 30 of the conveyor pulley.

Another advantage of the present combination pulley and gear reduction unit is the ease with which it can be assembled and disassembled and serviced in the field. While this combination has been described with reference to a pulley for use in belt conveyors, it can be used wherever a compact pulley and gear reduction unit combination is required. Further, the gear reduction unit may be used in other installations for driving other equipment and mechanisms apart from a pulley or the like.

Although only one embodiment of the present invention has been described in detail herein, various changes and modifications may be made without departing from the scope of the present invention.

I claim:

1. In combination with a pulley having a rim and two end discs with center openings therein and a nonrotatable shaft extending axially through said openings: a gear reduction unit mounted on said shaft, comprising a housing rotatably mounted on said shaft, a non-rotatable gear mounted on said shaft in said housing, a sleeve on said shaft having one end adjacent said gear and extending from said housing, a gear connected to said sleeve in axial alignment therewith and positioned adjacent said first mentioned gear, a pinion having a single set of teeth meshing with said gears and adapted to revolve therearound as said housing is rotated, said sleeve extending through the opening in one of said end discs for rotatably supporting one of said discs and the respective end of said pulley, and means movable with said sleeve and slidable axially relative to said last mentioned disc for operatively locking said disc and sleeve together.

2. In combination with a pulley having an axial opening therein and a shaft extending axially through said opening: a gear reduction unit mounted on said shaft and having a drive sleeve extending into said opening, a means for locking said sleeve and pulley in driving relation, said means consisting of an arcuate-shaped element seated in a transverse groove in the surface of said sleeve in said opening, and an arcuate-shaped recess in the portion of said pulley defining said opening for receiving said element, said element being movable with said sleeve and slidable axially in the opening in said pulley.

3. In combination with a pulley having a rim and two end discs with center openings therein and a shaft extending axially through said openings: a gear reduction unit mounted on said shaft and having a drive sleeve extending through the opening in one of said end discs for rotatably supporting said disc and the respective end of said pulley, and means movable with said sleeve and slidable axially relative to said last mentioned disc for operatively locking said disc and sleeve together.

4. In combination with a pulley having a rim and two recessed end discs with center openings therein and a nonrotatable shaft extending axially through said openings and beyond the ends of said rim: a gear reduction unit mounted on said shaft and seated in one end of said rim, said unit comprising a housing rotatably mounted on said shaft and adapted to rotate relative to said pulley, a drive means secured to said housing and positioned beyond the end of said rim, a nonrotatable gear mounted on said shaft in said housing, a sleeve on said shaft having one end adjacent said gear and extending from said housing, a gear connected to said sleeve in axial alignment therewith and positioned adjacent said first mentioned gear, said second gear being of the same diameter as and having a different number of teeth than said first gear, a pinion having a single set of teeth meshing with said gears and adapted to revolve therearound as said housing is rotated, said sleeve extending through the opening in one of said end discs, a means for locking said sleeve and end disc in driving relation, said means consisting of an arcuate-shaped element seated in a transverse groove in the surface of said sleeve in said opening, and an arcuate-shaped recess in the portion of said disc defining said opening for receiving said element, said element being movable with said sleeve and slidable axially relative to said last mentioned disc.

5. In combination with a conveyor pulley having a rim and two recessed end discs with center openings therein and a nonrotatable shaft extending axially through said openings and beyond the ends of said rim: a planetary gear reduction unit mounted on said shaft and seated in one end of said rim, said unit comprising a housing rotatably mounted on said shaft and adapted to rotate relative to said pulley, a sheave formed integrally with said housing and positioned beyond the end of said rim, a gear mounted on said shaft in said housing and secured in fixed position on said shaft, a sleeve on said shaft having one end adjacent said gear and extending from said housing, a gear mounted on said sleeve adjacent said first mentioned gear, said second gear being of the same diameter as and having a different number of teeth than said first gear, a pair of pinions having a single set of teeth meshing with said gears and adapted to revolve therearound as said housing is rotated, a pin for supporting each of said pinions in said housing, said sleeve extending through the opening in one of said end discs, a means for locking said sleeve and end disc in driving relation, said means consisting of an arcuate-shaped element seated in a transverse groove in the surface of said sleeve in said opening, and an arcuate-shaped recess in the portion of said disc defining said opening for receiving said element, said element being movable with said sleeve and slidable axially relative to said last mentioned disc.

References Cited in the file of this patent

UNITED STATES PATENTS

| | | |
|---|---|---|
| 552,183 | Johnson | Dec. 31, 1895 |
| 1,289,867 | Moore | Dec. 31, 1918 |
| 1,632,571 | Watson | June 14, 1927 |
| 2,807,485 | Seibert | Sept. 24, 1957 |
| 2,882,757 | Edsall | Apr. 21, 1959 |
| 2,949,048 | Lewis | Aug. 16, 1960 |
| 2,973,979 | Musser | Mar. 7, 1961 |